US010628772B2

(12) United States Patent
Krishnamurthy et al.

(10) Patent No.: US 10,628,772 B2
(45) Date of Patent: Apr. 21, 2020

(54) COMPUTING PACKAGE WALL DENSITY IN COMMERCIAL TRAILER LOADING

(71) Applicant: SYMBOL TECHNOLOGIES, LLC, Lincolnshire, IL (US)

(72) Inventors: Adithya H. Krishnamurthy, Hicksville, NY (US); Justin F. Barish, Kings Park, NY (US); Miroslav Trajkovic, Setauket, NY (US)

(73) Assignee: Symbol Technologies, LLC, Holtsville, NY (US)

(*) Notice: Subject to any disclaimer, the term of this patent is extended or adjusted under 35 U.S.C. 154(b) by 160 days.

(21) Appl. No.: 15/853,262

(22) Filed: Dec. 22, 2017

(65) Prior Publication Data
US 2019/0197455 A1 Jun. 27, 2019

(51) Int. Cl.
*G06Q 10/06* (2012.01)
*G06Q 50/28* (2012.01)
(Continued)

(52) U.S. Cl.
CPC ....... *G06Q 10/06393* (2013.01); *G06Q 50/28* (2013.01); *G06T 7/0004* (2013.01);
(Continued)

(58) Field of Classification Search
CPC .............. G06Q 10/06393; G06Q 50/28; G06T 2200/04; G06T 2207/10028;
(Continued)

(56) References Cited

U.S. PATENT DOCUMENTS 7,071,935 B1 * 7/2006 Deering .................... G06T 9/00
345/419
8,296,101 B1 * 10/2012 Barlow .................. G06Q 10/08
53/503
(Continued)

FOREIGN PATENT DOCUMENTS

GB 2531653 A 4/2016
WO 2014204710 A2 12/2014
(Continued)

OTHER PUBLICATIONS

International Search Report and Written Opinion for International Application No. PCT/US2018/059197 dated Jan. 8, 2019.

*Primary Examiner* — Gelek W Topgyal
(74) *Attorney, Agent, or Firm* — Yuri Astvatsaturov

(57) ABSTRACT

A method and apparatus for using a three-dimensional (3D) depth imaging system for use in commercial trailer loading is disclosed. The method and apparatus may be configured to determine a load-efficiency score for a trailer in a variety of ways. In one embodiment, the method and apparatus may determine the score by receiving a set of point cloud data based on 3D image data, analyzing the set of point cloud data, generating a set of data slices based on the set of point cloud data each data slice corresponding to a portion of the 3D image data, estimating a set of missing data points in each data slice in the set of data slices, and calculating a load-efficiency score based on the generated set of data slices and estimated set of missing data points.

18 Claims, 6 Drawing Sheets
(1 of 6 Drawing Sheet(s) Filed in Color)

(51) Int. Cl.
  *G06T 7/593* (2017.01)
  *G06T 7/00* (2017.01)
  *H04N 13/243* (2018.01)
  *G06T 7/62* (2017.01)

(52) U.S. Cl.
  CPC ............ *G06T 7/0008* (2013.01); *G06T 7/593* (2017.01); *G06T 7/62* (2017.01); *H04N 13/243* (2018.05); *G06T 2200/04* (2013.01); *G06T 2207/10028* (2013.01); *G06T 2207/30268* (2013.01)

(58) Field of Classification Search
  CPC ......... G06T 2207/30268; G06T 7/0004; G06T 7/0008; G06T 7/593; G06T 7/62; H04N 13/243
  See application file for complete search history.

(56) References Cited

U.S. PATENT DOCUMENTS

| | | | | |
|---|---|---|---|---|
| 2004/0066500 | A1* | 4/2004 | Gokturk | G01C 11/30 356/4.01 |
| 2014/0100812 | A1* | 4/2014 | Barlow | G06Q 10/08 702/137 |

FOREIGN PATENT DOCUMENTS

| | | | | |
|---|---|---|---|---|
| WO | WO-2014204710 | A2 * | 12/2014 | ............ G06Q 50/28 |
| WO | 2017087244 | A1 | 5/2017 | |

* cited by examiner

COMPUTING PACKAGE WALL DENSITY IN COMMERCIAL TRAILER LOADING

BACKGROUND OF THE INVENTION

In the trailer loading industry, there are numerous approaches to assessing whether a trailer has been loaded efficiently. Various metrics are used by different companies relating to trailer load efficiency. One way to measures efficiency is with the use of a three-dimensional camera combined with algorithms to detect how full a trailer is in real-time. A trailer's fullness is often calculated with reference to "walls" that are built inside the trailer from the materials packed into the trailer. However, this approach fails to pin-point where a trailer may be packed inefficiently, that is, the approach fails to pin-point where gaps in the packing of the trailer occur.

Accordingly, there is a need for a way to compute package wall density in the commercial trailer loading industry.

The patent or application file contains at least one drawing executed in color. Copies of this patent or patent application publication with color drawing(s) will be provided by the Office upon request and payment of the necessary fee.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
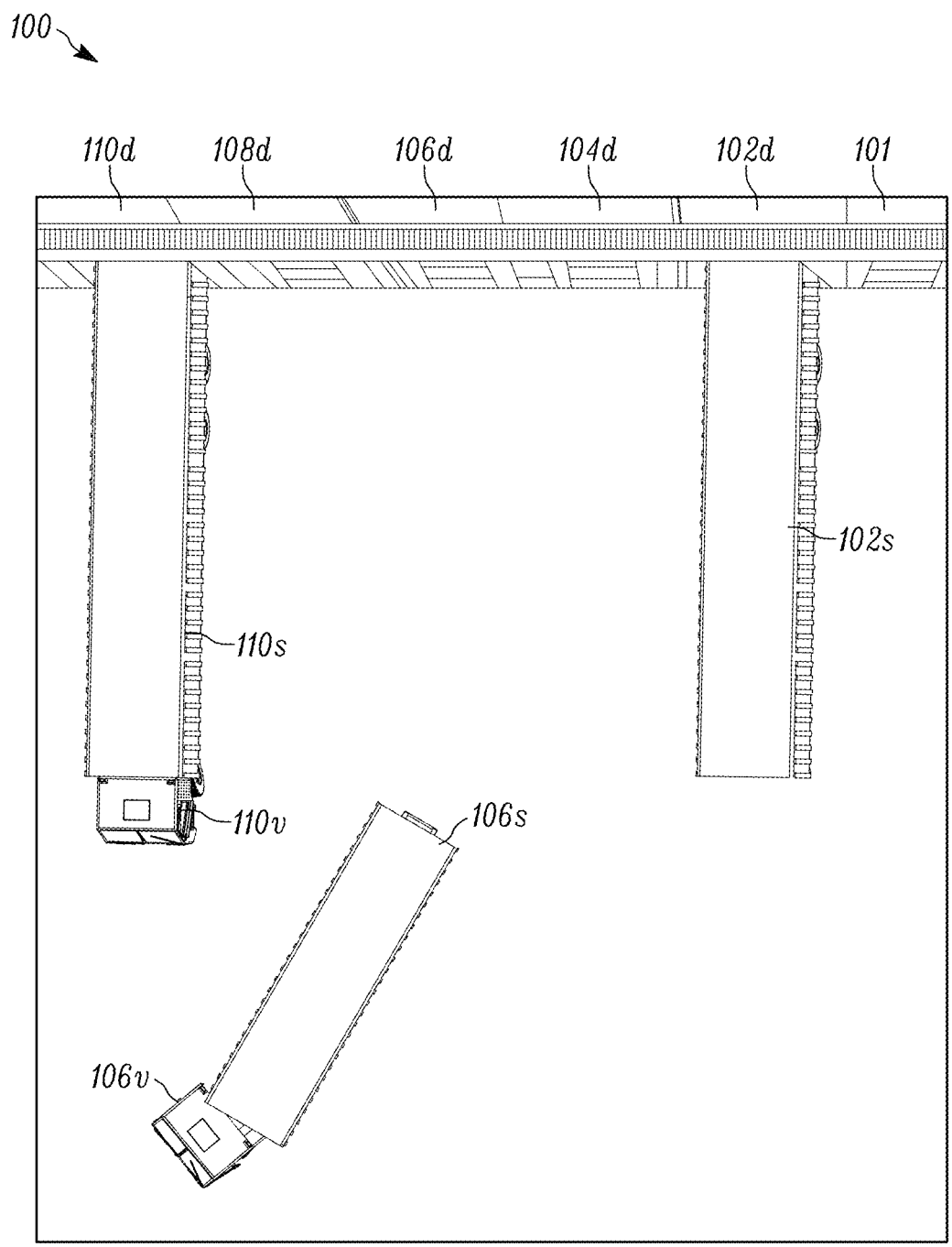
FIG. 1 is a perspective view, as seen from above, of a loading dock including a loading facility, a plurality of docking bays, a plurality of vehicles, and a plurality of vehicle storage areas, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems for a three-dimensional (3D) depth imaging system for use in commercial trailer loading are disclosed herein. In some embodiments, the 3D depth imaging system may include a variety of components, such as, but not limited to, a 3D-depth camera configured to capture 3D image data, and a load-efficiency application (app) executing on one or more processors. In some cases, the 3D-depth camera may be oriented in a direction to capture 3D image data of a storage area associated with a vehicle. The storage area may be a trailer used to transport goods. The load-efficiency app may be configured to determine, based on 3D image data, a load-efficiency score for the storage area. The load-efficiency app may determine the load-efficiency by using a set of point cloud data based on the 3D image data, analyzing the set of point cloud data, generate a set of data slices based on the set of point cloud data each data slice corresponding to a portion of the 3D image data, estimating a set of missing data points in each data slice in the set of data slices, and calculating a load-efficiency score based on the generated set of data slices and estimated set of missing data points. In some cases, the system may perform additional, fewer, or different steps.

Put another way, the disclosure relates to detecting the fullness of a set of package walls as measured from the floor to the ceiling of a trailer, allowing for the calculation of overall and region-based efficiency for how the trailer has been loaded. Typically, trailers are loaded in such a way that walls are constructed from the floor to the ceiling from the materials loaded into the trailer. Sections of these walls may be thought of as regions. So, for example, you could divide a wall of packages in a trailer into five equal regions representing twenty percent of the vertical space of the wall.

One way to measure the fullness of a trailer is by measuring the distance from trailer door to the farthest package wall. This measurement may be plotted over time while the trailer is being loaded. This measurement does not provide a full picture of how efficiently a trailer has been packed, as it does not break down the trailer load as a series of package walls, but is instead a timeline view of linear distance to package wall. A more accurate way to calculate a trailer load's efficiency is by measuring the load package wall by package wall as they are constructed, and computing wall quality, which is a measure of density of packages of the wall. In order to achieve this, the air gaps in each package wall may be computed. In an example, the package wall is broken up into analyzable portions, such as thin slices, and the three-dimensional (3D) composition of each slice is analyzed. Because the data is analyzed in slices, informed decisions can be made about the missing data and noise, giving accurate, stable air gap detection.

FIG. 1 is a perspective view, as seen from above, of a loading dock 100 including a loading facility 101, a plurality of docking bays 102d-110d, a plurality of vehicles 106v and 110v, and a plurality of vehicle storage areas 102s-110s, in accordance with example embodiments herein. In some embodiments, loading dock 100 may, for example, be associated with a retail store, a wholesale store, or other such commercial building. In other embodiments loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

For example FIG. 1 depicts loading facility 101, which, as described, may be a retail store, a storage facility, or other such similar location that accommodates the loading and unloading of transportable objects or goods. Loading facility 101 includes a plurality of docking bays 102d-110d. For example, docking bay 104d is depicted as undocked, and includes an opening of a size equal to or similar to that of an opening of a vehicle storage area. As depicted in FIG. 1, docking bay 104d may further include padding or insulation to receive a trailer (e.g., a vehicle storage area) against the wall of the loading facility 101. Docking bay 104d may further include a retractable door positioned within the opening of docking bay 104d, where the door may be opened to provide access to the vehicle storage area of a trailer from the loading facility 101. As described herein, docking bay 104d is representative of the remaining depicted docking bays, such as docking bays 102d, 106d, 108d, and 110d, where docking bays 102d, 106d, 108d, and 110d may have similar features or functionality as described herein for docking bay 104d.

In various embodiments, an opening of a vehicle storage area may be the opening of a trailer, where the trailer may be hauled by a semi, tractor-trailer, truck, or other such vehicle capable of hitching and moving a trailer (e.g., vehicle storage area), as described herein. In some embodiments the floor of a trailer, when docked, may be flush, or approximately flush, with the floor of a docking bay (e.g., docking bays 102d-110d) of loading facility 101.

FIG. 1 also depicts a plurality of vehicle storage areas 102s, 106s, and 110s. Vehicle storage areas 102s, 106s, and 110s may each be storage areas associated with a vehicle, for example, a trailer or other transportable storage area (e.g., 102s, 106s, and 110s) associated with a semi, tractor-trailer, truck, or other such large vehicle (e.g., 106v and 110v) as described herein. For example, as shown in FIG. 1, each of the vehicles 106v and 110v are associated with vehicle storage areas 106s and 110s respectively. Each of the vehicles 106v and 110v may be responsible for maneuvering their respective vehicle storage areas 106s and 110s to respective docking bays, such as docketing bays 106d and 110d.

As described herein, each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. For example, as shown in FIG. 1, vehicle storage area 102s is depicted as a trailer that is docked with docking bay 102d. Accordingly, the opening of vehicle storage areas 102s interfaces with the opening of docking bay 102d such that the interior of vehicle storage areas 102s may be viewed or accessed from docking bay 102d. Similarly, vehicle storage area 110s is also depicted as a trailer that is docked with docking bay 110d, where the opening of vehicle storage areas 110s interfaces with the opening of docking bay 110d such that the interior of vehicle storage areas 110s may be viewed or accessed from docking bay 110d. Vehicle storage area 106s is depicted as currently not docked with respect to docking bay 106d.

Vehicle storage areas, such as 102s, 106s, and 110s, may have different sizes, lengths, or otherwise dimensions. For example, in one embodiment, the vehicle storage area 102s may be associated with a 63 foot long trailer, vehicle storage area may be associated with a 53 foot long trailer, and vehicle storage area 110s may be associated with a 73 foot long trailer. Other variations of vehicle storage area dimensions, sizes, and/or lengths are contemplated herein.

Figure 2A:
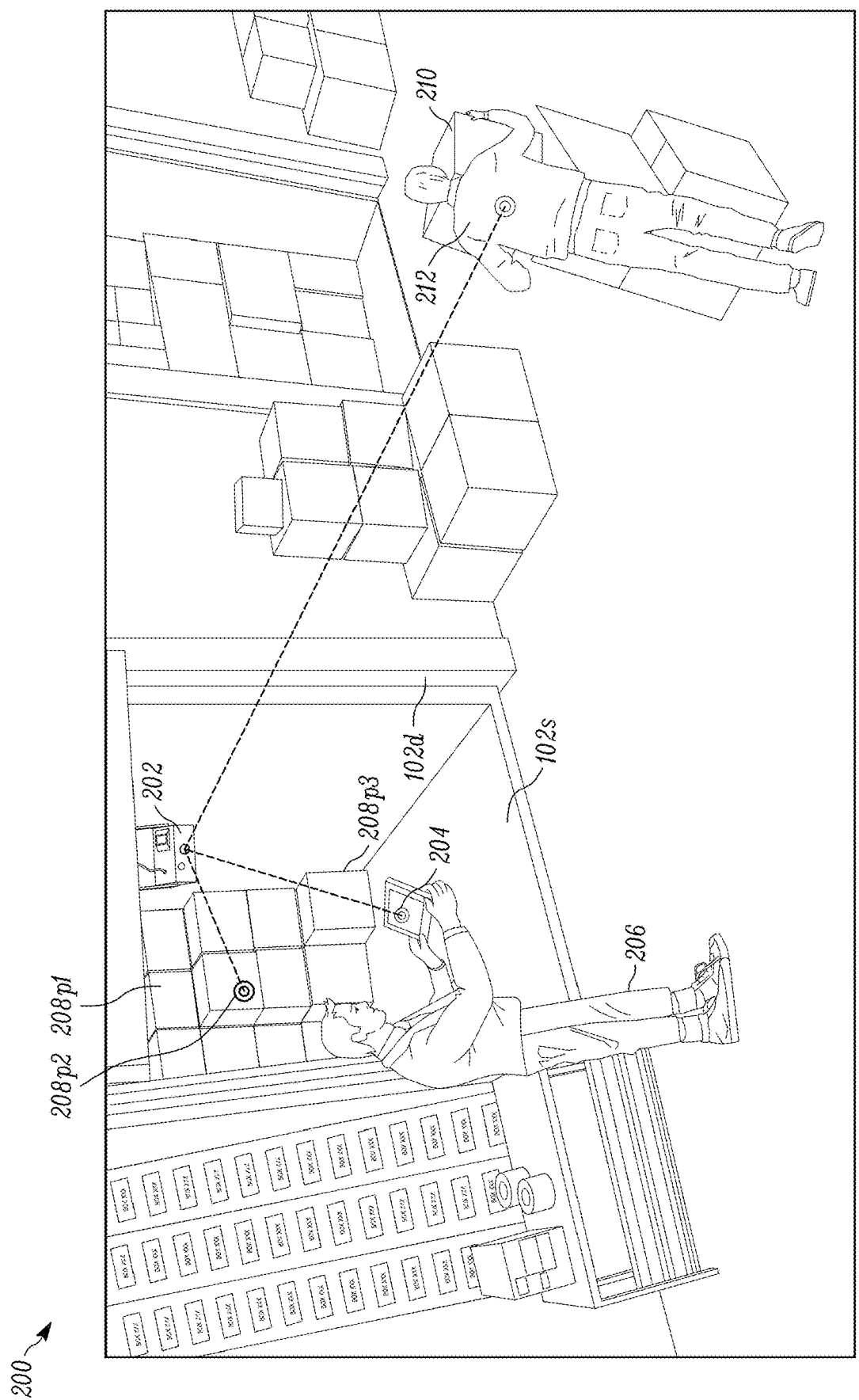
FIG. 2A is a perspective view of the loading facility of FIG. 1 depicting a vehicle storage area docked at a docking bay, in accordance with example embodiments herein.

FIG. 2A is a perspective view 200 of the loading facility 101 of FIG. 1 depicting vehicle storage area 102s docked at a docking bay 102d, in accordance with example embodiments herein. For example, FIG. 2A depicts vehicle storage area 102s, which in the embodiment of FIG. 2A is an interior view of the vehicle storage area 102s of FIG. 1. FIG. 2A also depicts docking bay 102d, which in the embodiment of FIG. 2A is an interior view of the docking bay 102d of FIG. 1. As depicted in FIG. 2A, vehicle storage area 102s is docked with docking bay 102d exposing the interior of vehicle storage area 102s to the interior of loading facility 101. Vehicle storage area 102s includes packages, boxes, and/or other transportable objects or goods, including packages 208p1-208p3, which may, in some embodiments, correspond to package walls, as described herein. The packages 208p1-208p3 may be in a state of being loaded or unloaded into vehicle storage area 102s. For example, worker 212 may be in a state of loading or unloading additional packages 210 into or out of vehicle storage area 102s. In some embodiments, manager 206 may oversee, assist, or otherwise additionally facilitate the loading or unloading packages, boxes, and/or other transportable objects or goods (e.g., packages 208p1-208p3 or 210) into or out of the vehicle storage area 102s. For example, manager 206 may utilize a dashboard app executing on client device 204 as described herein.

FIG. 2A also depicts a trailer monitoring unit (TMU) 202. TMU 202 may be a mountable device that includes a 3D-depth camera for capturing 3D images (e.g., 3D image data) and a photo-realistic camera (e.g., 2D image data). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, and as shown in FIG. 2A, the TMU 202 may be mounted within loading facility 101 and oriented in the direction of vehicle storage area 102s to capture 3D and/or 2D image data of the interior of vehicle storage area 102s. For example, as shown in FIG. 2A, TMU 202 may be oriented such that the 3D and 2D cameras of TMU 202 look down the length of the vehicle storage area 102s so that TMU 202 may scan or sense the walls, floor, ceiling, packages (e.g., 208p1-208p3 or 210), or other objects or surfaces with vehicle storage area 102s to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 202 may process the 3D and 2D image data, as scanned or sensed from the 3D-depth camera and photo-realistic camera, for use by other devices (e.g., client device 204 or server 301, as further described herein). For example, the one or more processors and/or one or more memories of the TMU 202 may process the image data scanned or sensed from vehicle storage area 102s. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server (e.g., server 301 as further described herein) for storage or for further manipulation.

As shown in FIG. 2A, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210), as described herein. In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 301 described herein. In such embodiments, the server or server may generate post-scanning data that may include metadata, simplified data, normalized data, result data, status data, or alert data as determined from the original scanned or sensed image data provided by the TMU 202. As described herein, the server or centralized may store such data, and may also send the image data and/or the post-scanning data to a dashboard app, or other app, implemented on client device, such as the dashboard app implemented on client device 204 of FIG. 2A.

Figure 2B:
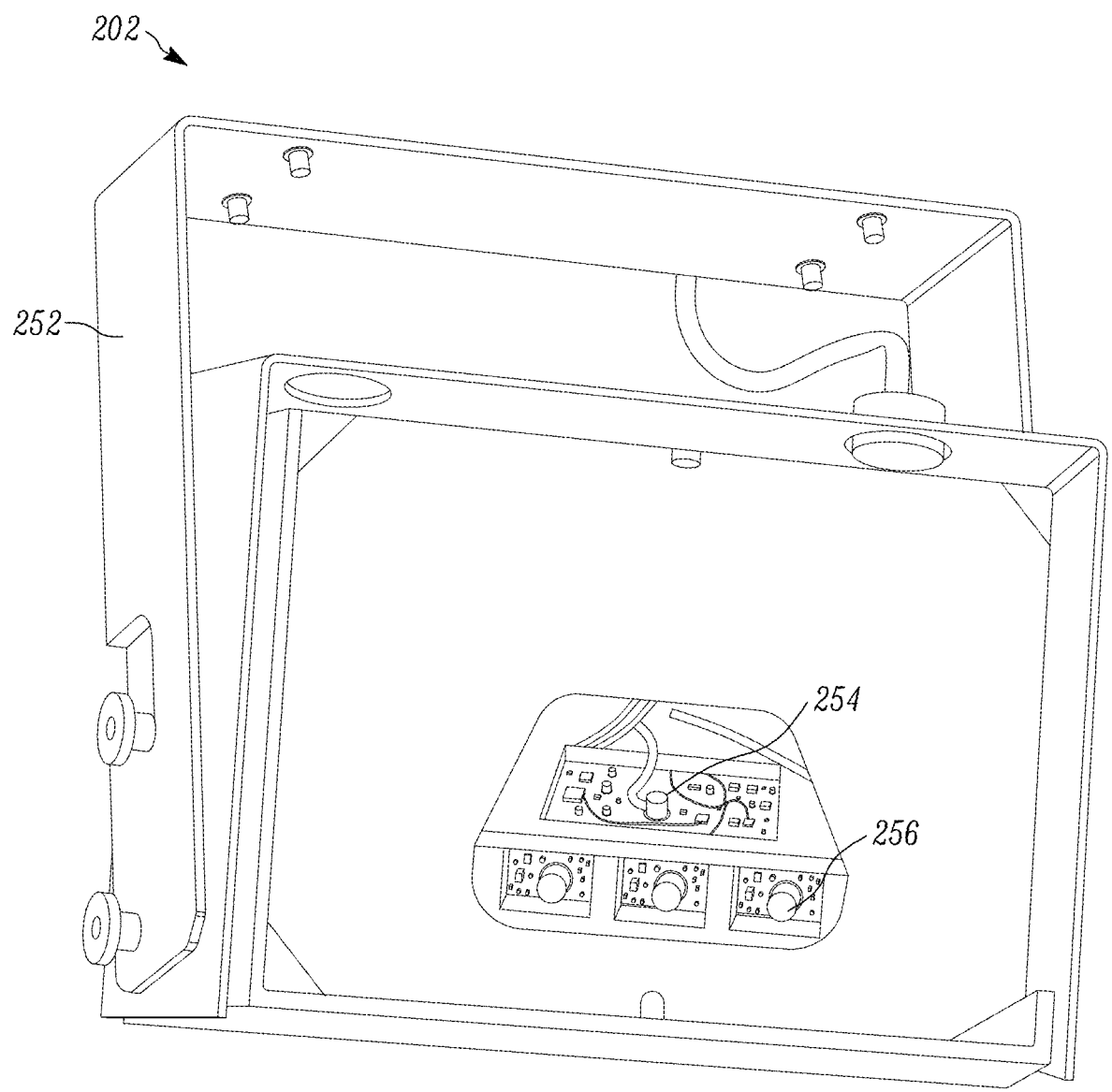
FIG. 2B is a perspective view of a trailer monitoring unit (TMU) of FIG. 2A, in accordance with example embodiments herein.

FIG. 2B is a perspective view of the TMU 202 of FIG. 2A, in accordance with example embodiments herein. In the example embodiment of FIG. 2B, TMU 202 may include a mounting bracket 252 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data and/or post-scanning data.

TMU 202 may include a 3D-depth camera 254 for capturing, sensing, or scanning 3D image data. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102s) or objects within the vehicle storage area, such as boxes or packages (e.g., packages 208p1-208p3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102s. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 254, for example, the vehicle storage area 102s and any objects or surfaces therein.

The TMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the TMU 202 can have both sets of 3D image data and 2D image data available for a particular surface, object, or scene at the same or similar instance in time.

Figure 3:
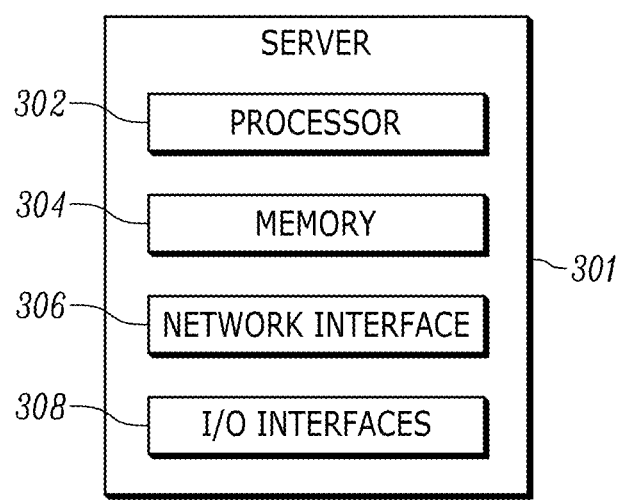
FIG. 3 is a block diagram representative of an embodiment of a server associated with the loading facility of FIG. 2A and the TMU of FIG. 2B.

FIG. 3 is a block diagram representative of an embodiment of a server associated with the loading facility 101 of FIG. 2A. In some embodiments, server 301 may be located in the same facility as loading facility 101. In other embodiments, server 301 may be located at a remote location, such as on a cloud-platform or other remote location. In ether embodiment, server 301 may be communicatively coupled to a 3D-depth camera (e.g., TMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used. In addition, TMU 202 may further include a network interface to enable communication with other devices (such as server 301 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4:
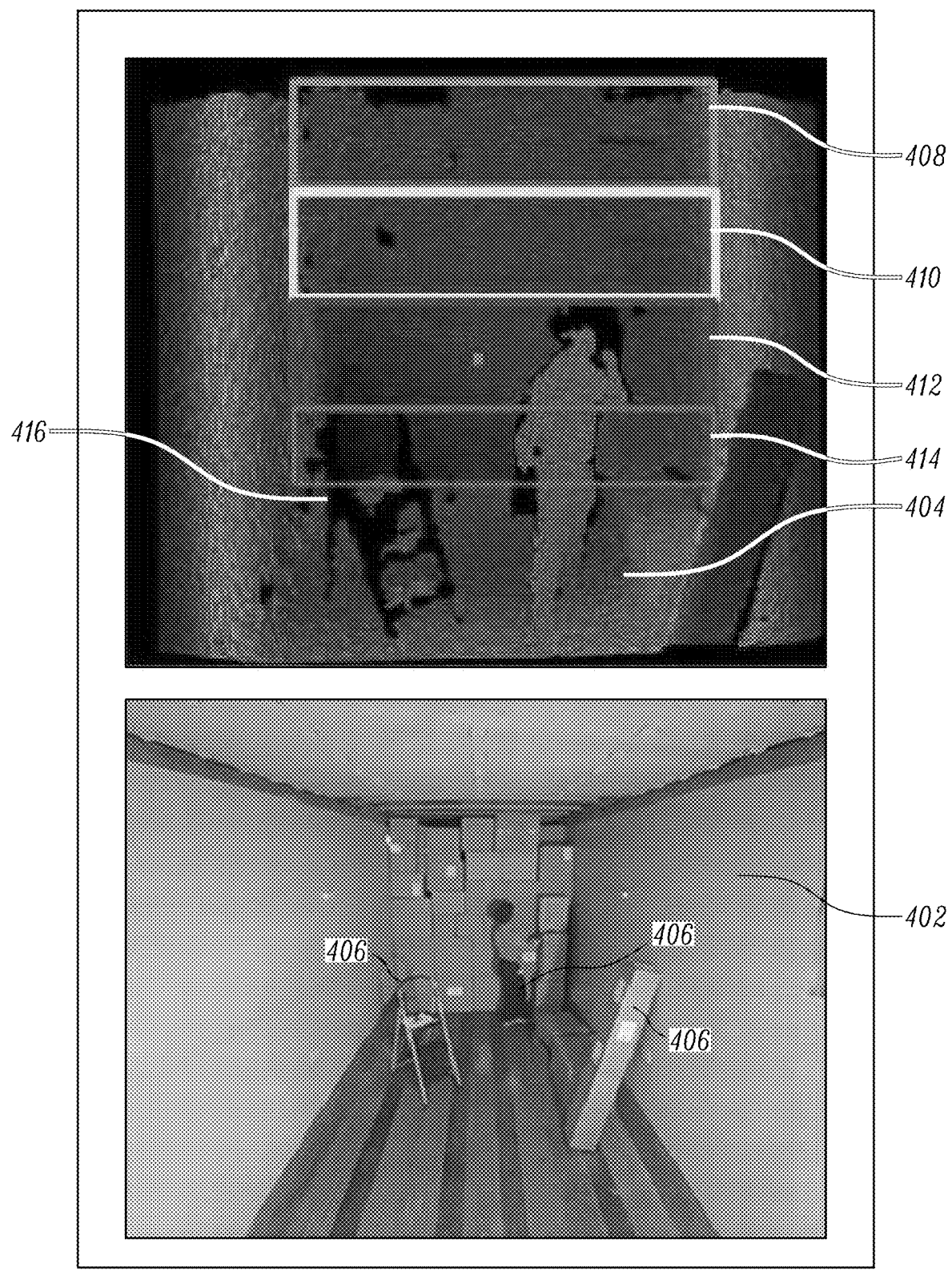
FIG. 4 is a set of images detailing the interior of a commercial trailer.

FIG. 4 shows a set of images 400, including a photorealistic image 402 of a commercial trailer, and an image 404 of the same trailer showing 3D image data as captured by a 3D-depth camera (e.g., such as 3D-depth camera 254 of TMU 202). The photo-realistic image 402 shows multiple objects 406 that are in the trailer, such as boxes, a step stool, and a worker loading the trailer. As the commercial trailer is loaded, and becomes fuller, more and more objects will fill the space in the trailer.

The image 404 shows what the same trailer might look like through the "eyes" of a 3D-depth camera (e.g., such as 3D-depth camera 254 of TMU 202). The image 404 may be represented as a set of point cloud data, or a 3D image where each point represents an x, y, and z coordinate in space. To detect wall gaps for purposes of calculating the package wall density in the methods and systems disclosed herein, many items that show up in the 3D image data may be removed for calculation purposes. For example, a step stool 414 is shown in the image 404. The stepstool is not relevant to calculating the package wall density, so the data points associated with the stepstool 416 can be removed.

A wall of packages may be identified and then the wall of packages may be divided for more precise evaluation of how well packed the trailer is. For example, the package wall may be divided into four equal regions 408, 410, 412, and 414. The bottom region 414 may be discarded, because it is the most cluttered by objects (like the ladder), and by staged boxes (boxes sitting on the floor waiting to be put into the wall). In other embodiments, the bottom region 414 may be included in any calculations of package wall density. Dividing the wall into equal regions provides detailed statistics for each region of the wall, and may make analysis of the density easier to process. Any of the systems and methods discussed herein may be able to analyze and determine the package wall density from image 404.

Figure 5:
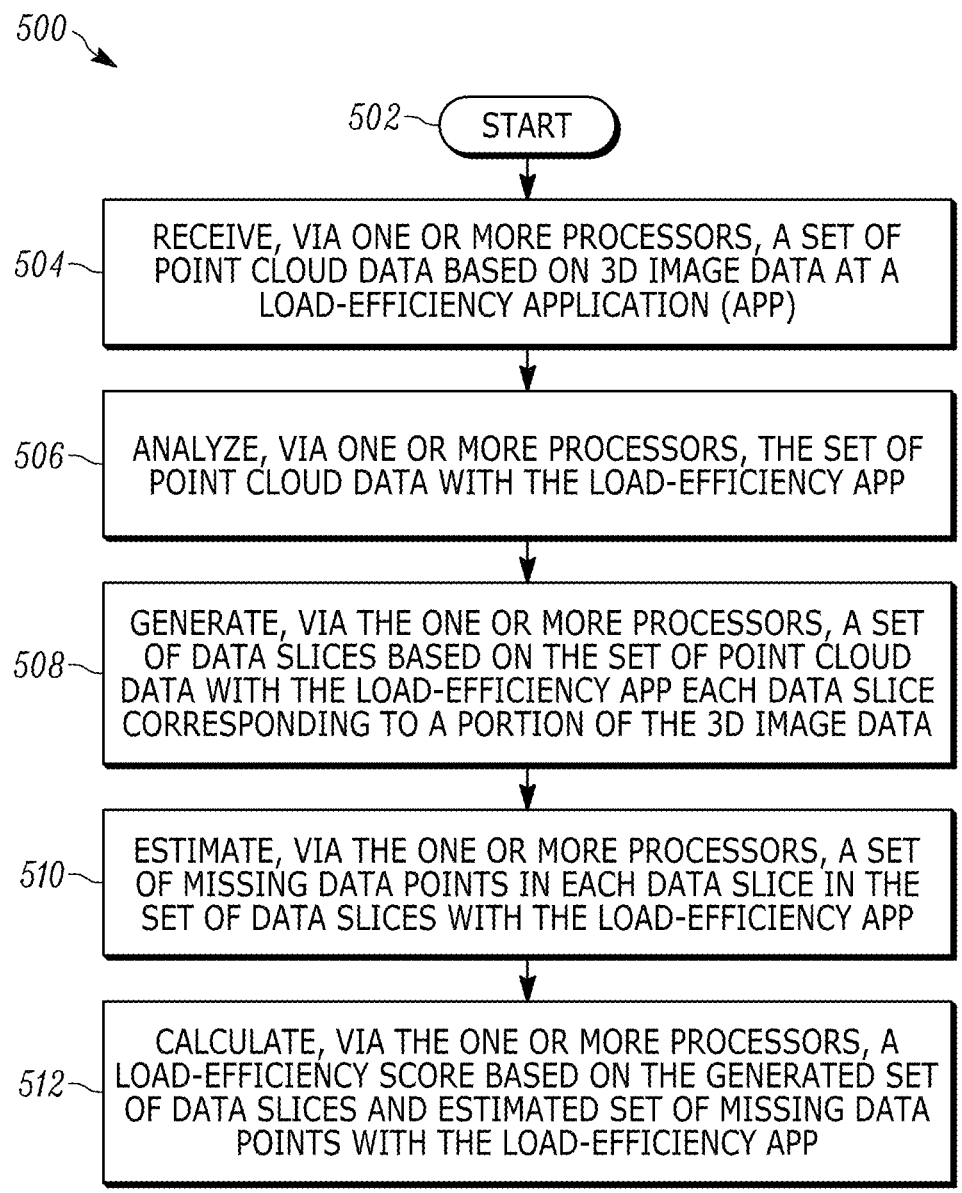
FIG. 5 is a flow chart of a method for computing wall density for use in commercial trailer loading.

FIG. 5 is a flow chart of a package wall density imaging method 700 for use in commercial trailer loading. Method 500 starts at block 502, where a 3D-depth camera (e.g., such as 3D-depth camera 254 of TMU 202) captures 3D image data of a vehicle storage area (e.g., such as vehicle storage area 102s). The 3D-depth camera is oriented in a direction to capture the 3D image data of the vehicle storage area as described herein. In various embodiments, the 3D image data may be 3D point cloud data. Such point cloud data may be represented in a variety of formats, including the Polygon File Format (ply) or the Point Cloud Library Format (pcd). In additional embodiments, the 3D image data may be captured periodically, for example, such as every 30 seconds, every minute, or every two minutes, etc., but may be captured at any time frequency provided by the related 3D-depth camera, e.g., such as provided by TMU 202.

At block 504, the 3D image data captured by the 3D-depth camera is received by a load-efficiency app executing on one or more processors. The 3D image data may be received as a set of point cloud data, such as the types of point cloud data described above, by the load-efficiency app. In some embodiments, the one or more processers may be processors (s) of the TMU 202, as described herein. In certain embodiments the 3D-depth camera and the one or more processors may be housed in a mountable device, such as TMU 202 depicted in FIGS. 2A and 2B. In other embodiments, the one or more processors may be processors(s) (e.g., processor 302) of the server 301 as described herein. Based on the 3D image data, the load-efficiency app determines a load-efficiency score for the storage area.

The load-efficiency score may be a way to measure how efficiently packed a commercial trailer is. The more efficiently packed a trailer the more profitable operating the trailer can be, and the more materials can be sent per trailer. In some embodiments, the load-efficiency score for the storage area may be a metric representative of a ratio between filled space in the storage area and available space in the storage area up to a wall in the storage area. Available space can be calculated by the load-efficiency app as an amount of space in the trailer that is filled minus an amount of space in the trailer that is unused. Filled space may be space that contains objects in it already, such as the packages that comprise a package wall, or workers that are loading a trailer.

As part of determining the load-efficiency score, the load-efficiency app analyses the 3D image data via one or more processors at block 506. The load-efficiency app may remove some of the data points in the set of point cloud data that are not relevant to determining the load-efficiency score. For example, data points that correspond to the boundaries of the commercial trailer (e.g. the floor, the ceiling, the walls) may not be necessary as part of the load-efficiency score calculation. As such, the load-efficiency app may remove any data points in the set of cloud point data that correspond to those boundaries. One way in which the load-efficiency score app may determine what data points to remove is by removing data points that are on or outside a plane that defines at least one boundary of the storage area. These planes may be predefined according to known dimensions for the commercial trailer, and so the load-efficiency app may know in advance the boundaries. In other embodiments, the plane that defines at least one boundary may be dynamically determined by the load-efficiency app as it executes the method.

Similarly, in some embodiments when analyzing the set of point could data the load-efficiency score app may divide the set of point cloud data into a set of regions. The regions may be equal regions, such as those discussed above with respect to FIG. 4, they may be unequal regions, or in some cases the regions may be non-overlapping regions. In some embodiments, each non-overlapping region may be composed of a set of data slices. After dividing the set of point cloud data into regions, one or more regions may be removed from the set of regions. This may be done to speed up processing of the wall density calculation, or for other reasons. Where each non-overlapping region is composed of a set of data slices they may be aggregated into one overall load efficiency score per region. These scores may then later be aggregated together to calculate the load efficiency score for the whole trailer, or any part of it.

At block 508, a set of data slices is generated by the load-efficiency app executing on one or more processors. The set of data slices may be based on the set of point cloud data, and each data slice generated may correspond to a portion of the 3D image data. In some embodiments, the load-efficiency app may divide the set of point cloud data corresponding to a vertical wall plane into a set of horizontal slices. The vertical wall plane may correspond to a package wall that is constructed as the trailer is loaded. Each horizontal slice may correspond to a region, such as the regions discussed above, a certain percentage of the specific section of the trailer, such as a package wall, or combinations thereof. In particular, each horizontal slice may, for example, correspond to 1%, 2%, 5%, or another percentage of the floor to ceiling portion of a package wall as seen through the lens of the 3D depth camera.

At block 510, a set of missing data points in each data slice in the set of data slices is estimated by the load-efficiency app executing on one or more processors. These missing data points may be used as part of the process to determine how efficiently packed a package wall is. In some embodiments, estimating missing points in data slices may include scanning each data slice for gaps in a data arrangement, and calculating an approximate number of missing points for each data slice. The data arrangement may be a way that each data slice is organized by the load-efficiency app.

For example, each data slice may include points in the x, y, or z axis, and may be scanned along an x-axis first, a y-axis first, a z-axis first, or combinations thereof. Accordingly, a gap in the data arrangement may correspond to the load-efficiency app scanning the data slice along the x-axis and not finding data at points along the x-axis. The load-efficiency app may start at the origin and read data points along the x-axis until point two and then record that no data points appear again until point six. The load-efficiency app may then determine that a gap exists along the x-axis from point two to point six. The load-efficiency app may then scan the entire data slice and calculate the approximate number of missing points for each data slice. This process may repeat until a set of missing data points is estimated for all the data slices. In some embodiments, the load-efficiency app may detect that a pixel has data, but the "intensity" of the data at that pixel is below a certain threshold and therefore the pixel is considered empty for gap analysis purposes.

At block 512, a load-efficiency score may be calculated by the load-efficiency app executing on one or more processors. The load-efficiency score may be based on the generated set of data slices and the estimated set of missing data points. In some embodiments, the load-efficiency app may calculate the load-efficiency score by dividing the set of point cloud data into a set of non-overlapping regions, wherein each non-overlapping region is composed of a set of data slices, and calculating a composite ratio for each region wherein the corresponding data slice ratios are aggregated into an overall load efficiency score per region. In another embodiment, the load-efficiency app may calculate the load-efficiency score by calculating a ratio of the number of points that are part of a wall to a summation of the number of points behind the wall and an approximated number of missing points.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A three-dimensional (3D) depth imaging system for use in commercial trailer loading, the 3D depth imaging system comprising:
 a 3D-depth camera configured to capture 3D image data, the 3D-depth camera oriented in a direction to capture 3D image data of a storage area associated with a vehicle; and
 a load-efficiency application (app) executing on one or more processors, the load-efficiency app being configured to determine, based on the 3D image data, a load-efficiency score for the storage area,
 wherein the determination of the load-efficiency score causes the load-efficiency app to receive a set of point cloud data based on the 3D image data, to analyze the set of point cloud data, to generate a set of data slices based on the set of point cloud data each data slice corresponding to a portion of the 3D image data, to estimate a set of missing data points in each data slice in the set of data slices, and to calculate the load-efficiency score based on the generated set of data slices and estimated set of missing data points,
 wherein the load-efficiency score for the storage area is a metric representative of a ratio between filled space in the storage area and available space in the storage area up to a wall in the storage area, and
 wherein available space is calculated as an amount of filled space in the storage area minus an amount of unused space in the storage area.

2. The 3D depth imaging system of claim 1, wherein to analyze the set of point cloud data the load-efficiency app is further configured to:
 divide the set of point cloud data into a set of non-overlapping regions, wherein each non-overlapping region is composed of a set of data slices; and
 remove one region of the set of non-overlapping regions.

3. The 3D depth imaging system of claim 2, wherein for each region the corresponding data slice ratios are aggregated into one overall load efficiency score per region.

4. The 3D depth imaging system of claim 1, wherein to analyze the set of point cloud data the load-efficiency app is further configured to:
 remove a set of data points that are outside a plane that defines at least one boundary of the storage area.

5. The 3D depth imaging system of claim 1, wherein to generate the set of data slices the load-efficiency app is further configured to:
 divide the set of point cloud data into a set of horizontal planes, wherein each data slice corresponds to a horizontal plane in the set.

6. The 3D depth imaging system of claim 1, wherein to estimate a set of missing data points in each data slice the load-efficiency app is further configured to:
 scan each data slice for gaps in a data arrangement; and
 calculate an approximate number of missing points for each data slice.

7. The 3D depth imaging system of claim 1, wherein to calculate the load-efficiency score the load-efficiency app is further configured to:
 divide the set of point cloud data into a set of non-overlapping regions, wherein each non-overlapping region is composed of a set of data slices; and
 calculate a composite ratio for each region wherein the corresponding data slice ratios are aggregated into an overall load efficiency score per region.

8. The 3D depth imaging system of claim 1, wherein to calculate the load-efficiency score the load-efficiency app is further configured to:
 calculate a ratio of the number of points that are part of a wall, with the number of points behind the wall plus an approximated number of missing points.

9. The 3D depth imaging system of claim 1, wherein to estimate a set of missing data points in each data slice in the set of data slices the load-efficiency app is further configured to:
 detect when there is no depth value for an expected data point.

10. A computer-implemented method for use in commercial trailer loading, the method comprising:
 receiving, at one or more processors, a set of point cloud data based on 3D image data;
 analyzing, at the one or more processors, the set of point cloud data;
 generating, at the one or more processors, a set of data slices based on the set of point cloud data each data slice corresponding to a portion of the 3D image data;
 estimating, at the one or more processors, a set of missing data points in each data slice in the set of data slices; and calculating, at the one or more processors, a load-efficiency score based on the generated set of data slices and estimated set of missing data points, wherein to calculate the load-efficiency score the load-efficiency app is further configured to calculate a ratio of the number of points that are part of a wall, with the number of points behind the wall and an approximated number of missing points.

11. The computer-implemented method of claim 10, wherein analyzing the set of point cloud data further comprises:

dividing, at the one or more processors, the set of point cloud data into a set of non-overlapping regions, wherein each non-overlapping region is composed of a set of data slices; and removing, at the one or more processors, one region of the set of non-overlapping regions.

12. The computer-implemented method of claim 11, wherein for each region the corresponding data slice ratios are aggregated into one overall load efficiency score per region.

13. The computer-implemented method of claim 10, wherein analyzing the set of point cloud data further comprises:

removing, at the one or more processors, a set of data points that are outside a plane that defines at least one boundary of the storage area.

14. The computer-implemented method of claim 10, wherein generating the set of data slices further comprises:

dividing, at the one or more processors, the set of point cloud data into a set of horizontal planes, wherein each data slice corresponds to a horizontal plane in the set.

15. The computer-implemented method of claim 10, wherein estimating a set of missing data points in each data slice further comprises:

scanning, at the one or more processors, each data slice for gaps in a data arrangement; and calculating, at the one or more processors, an approximate number of missing points for each data slice.

16. The computer-implemented method of claim 10, wherein calculating the load-efficiency score further comprises:

dividing, at the one or more processors, the set of point cloud data into a set of non-overlapping regions, wherein each non-overlapping region is composed of a set of data slices; and calculating, at the one or more processors, a composite ratio for each region wherein the corresponding data slice ratios are aggregated into an overall load efficiency score per region.

17. The computer-implemented method of claim 10, wherein estimating a set of missing data points in each data slice further comprises:

detecting, at the one or more processors, when there is no depth value for an expected data point.

18. A three-dimensional (3D) depth imaging system for use in commercial trailer loading, the 3D depth imaging system comprising:

a 3D-depth camera configured to capture 3D image data, the 3D-depth camera oriented in a direction to capture 3D image data of a storage area associated with a vehicle; and a load-efficiency application (app) executing on one or more processors, the load-efficiency app being configured to determine, based on the 3D image data, a load-efficiency score for the storage area, wherein the determination of the load-efficiency score causes the load-efficiency app to receive a set of point cloud data based on the 3D image data, to analyze the set of point cloud data, to generate a set of data slices based on the set of point cloud data each data slice corresponding to a portion of the 3D image data, to estimate a set of missing data points in each data slice in the set of data slices, and to calculate the load-efficiency score based on the generated set of data slices and estimated set of missing data points, wherein to calculate the load-efficiency score the load-efficiency app is further configured to calculate a ratio of the number of points that are part of a wall, with the number of points behind the wall plus an approximated number of missing points.

* * * * *